(12) United States Patent
Deker

(10) Patent No.: US 7,584,046 B2
(45) Date of Patent: Sep. 1, 2009

(54) METHOD FOR ASSISTING LOW ALTITUDE NAVIGATION OF AN AIRCRAFT

(75) Inventor: Guy Deker, Cugnaux (FR)

(73) Assignee: Thales (FR)

( * ) Notice: Subject to any disclaimer, the term of this patent is extended or adjusted under 35 U.S.C. 154(b) by 572 days.

(21) Appl. No.: 10/583,143

(22) PCT Filed: Dec. 13, 2004

(86) PCT No.: PCT/EP2004/053431
§ 371 (c)(1),
(2), (4) Date: Jun. 16, 2006

(87) PCT Pub. No.: WO2005/069094
PCT Pub. Date: Jul. 28, 2005

(65) Prior Publication Data
US 2007/0150170 A1   Jun. 28, 2007

(30) Foreign Application Priority Data
Dec. 19, 2003   (FR) .................................. 03 15035

(51) Int. Cl.
*G06G 7/76* (2006.01)
(52) U.S. Cl. ..................................... 701/120
(58) Field of Classification Search ................. 701/3–5, 701/11, 16–18, 120; 244/180, 183, 186
See application file for complete search history.

(56) References Cited

U.S. PATENT DOCUMENTS

| 6,097,996 | A | 8/2000 | Deker |
| 6,161,063 | A | 12/2000 | Deker |
| 6,173,219 | B1 | 1/2001 | Deker |
| 6,181,987 | B1 | 1/2001 | Deker et al. |
| 6,269,301 | B1 | 7/2001 | Deker |
| 6,347,263 | B1 | 2/2002 | Glover et al. |
| 7,433,779 | B2 * | 10/2008 | Deker et al. ................. 701/122 |

FOREIGN PATENT DOCUMENTS

EP   0 775 953   5/1997

* cited by examiner

*Primary Examiner*—Yonel Beaulieu
(74) *Attorney, Agent, or Firm*—Lowe Hauptman Ham & Berner, LLP

(57) ABSTRACT

A method for assisting low-altitude navigation of an aircraft equipped with a system suited to determine a flight-plan ground trajectory based on intermediate points P at an altitude alt(P), and the aircraft's performance. The method includes the following steps: for each point P, calculating a safe altitude, to obtain a point $P_{safe}$, calculating a safe profile formed from segments joining the points $P_{safe}$, extracting summits S from among the points $P_{safe}$, determining the aircraft's weight at these points S, for each point S, determining the maximum climb slope MaxClimbFPA and the maximum descent slope MaxDescFPA, defining two performance segments which have slopes MaxClimbFPA and MaxDescFPA on either side of the point S and calculating a performance profile formed from performance segments.

20 Claims, 3 Drawing Sheets

METHOD FOR ASSISTING LOW ALTITUDE NAVIGATION OF AN AIRCRAFT

CROSS REFERENCE TO RELATED APPLICATIONS

The present Application is based on International Application No. PCT/EP2004/053431, filed on Dec. 13, 2004, which in turn corresponds to French Application No. 0315035, filed on Dec. 19, 2003, and priority is hereby claimed under 35 USC §119 based on these applications. Each of these applications are hereby incorporated by reference in their entirety into the present application.

TECHNICAL FIELD

The invention relates to low-altitude navigation of an aircraft.

DESCRIPTION OF RELATED ART

Methods for assisting low-altitude navigation are already known for very maneuverable aircraft such as fighter planes. But they are not suitable for aircraft with limited maneuverability performance such as cargo airplanes and airliners.

Furthermore, the document EP 0775953 relating to a method for piloting a military transport airplane at low-altitude by analyzing the trajectory by successive segments having a maximum length of less than twice a distance considered a priori as necessary for avoiding too frequent changes in slope is known. This analysis leads to a computational load more connected to the length of the trajectory than the nature of the relief being overflown.

SUMMARY

A significant objective of the invention is therefore to propose a method for assisting safe, low-altitude navigation in three-dimensions (3-D) for an aircraft having limited performance aiming at making the computational load depend on the nature of the relief being overflown, such that for example flying above the side of a mountainous massif leads to fewer calculations than flying over a series of hills and valleys.

To reach this objective, the invention proposes a method for assisting low-altitude navigation of an aircraft equipped with a flight management system suited to determining a flight-plan ground trajectory for the aircraft based on a sequence of straight and/or curved segments joining intermediate points on the ground P at an altitude alt(P), where the ground trajectory takes into consideration the aircraft's performance and limitations, mainly characterized in that it comprises the following steps for the flight management system consisting in:

for each point P on the ground trajectory, calculating a safe altitude, alt safe, to obtain a point $P_{safe}$ such that alt safe $(P_{safe})$=Max[alt(P+lat mrg R), alt(P+lat mrg L)]+ vert mrg, where lat mrg R and lat mrg L are respectively predetermined right and left lateral margins and vert mrg is a predetermined vertical margin, calculating a safe profile formed from safe segments joining the points $P_{safe}$, extracting summit points S from among the points $P_{safe}$ of the safe profile such that the K points located before S and after S have a safe altitude below that of S, K being a determined parameter, determining the aircraft's weight at these points S as a function of the distance along the safe profile between the aircraft and this point S and of the aircraft's consumption over this distance, where the consumption is an aspect of the aircraft's performance and limitations, for each point S, determining the maximum climb slope MaxClimbFPA that the aircraft can support to reach S and the maximum descent slope MaxDescFPA which the aircraft can support for following the lowest ground trajectory after having passed through S, as a function of the aircraft's performance and limitations and the weight, defining two performance segments which have a first end at S, slopes MaxClimbFPA and MaxDescFPA on either side of the point S and a second end at the point of intersection with the terrain or with another performance segment arising from another point S and calculating a performance profile formed from performance segments and which makes it possible to associate at each point P of the safe profile a performance altitude, alt perf(P).

According to a feature of the invention, a flyable low-altitude profile is determined based on the safe profile and the performance profile.

This method makes it possible to quickly calculate a three-dimensional flyable profile which is safe and optimized for following the ground trajectory, in particular in an environment with significant relief; it also makes it possible to minimize the time during which the aircraft pilot must manually fly before the automatic pilot can safely resume control on the updated 3-D profile.

According to a feature of the invention, the determination of the flyable profile consists more specifically of calculating for each point P of the ground trajectory a low-altitude flight altitude, alt flight, for obtaining a point $P_{flight}$ such that alt flight $(P_{flight})$=Max[alt safe (P), alt perf (P)], where the flyable low-altitude profile is formed from segments joining the points $P_{flight}$.

The flyable profile is thus always higher than (or as high as) the safe profile and therefore does not require a posteriori verification of the profile's altitudes relative to those of the terrain.

Since the flight management system has the wind speed and direction, aircraft speed, altitude of the terrain, and local temperature, the slopes MaxClimbFPA and MaxDescFPA are preferably weighted as a function of the wind speed and direction and/or aircraft speed, and/or altitude of the terrain and/or local temperature.

The invention also relates to a flight management system comprising a central unit which communicates with an input-output interface, a program memory, a working memory, and a data storage memory, by means of data-transfer circuits, the input-output interface being connected to a database of the terrain to be flown over, characterized in that the program memory includes a program for implementing the method such as described.

BRIEF DESCRIPTION OF THE DRAWINGS

Other features and advantages of the invention will become apparent on reading the detailed description which follows, prepared as a nonlimiting example and referring to the attached drawings in which.

DETAILED DESCRIPTION

In the following it is assumed that the aircraft includes a flight management system FMS.

Figure 1:
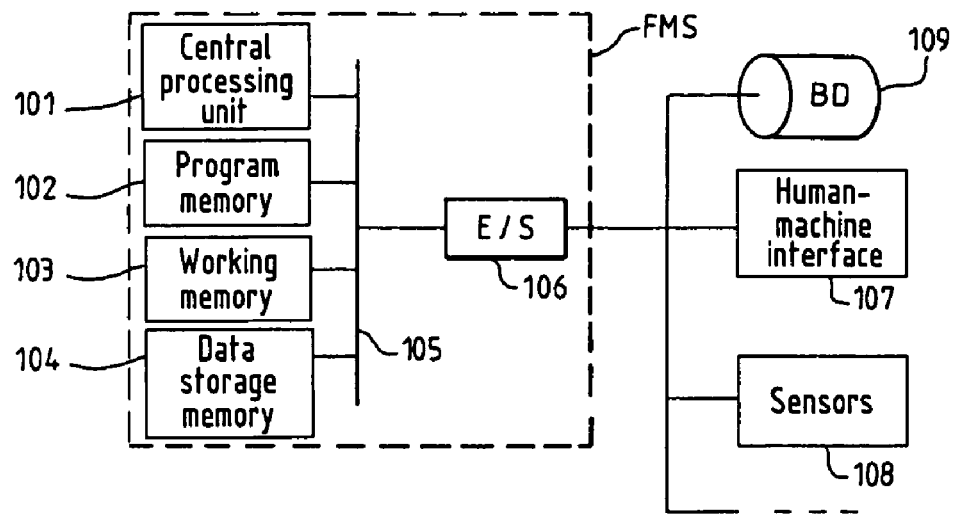
FIG. 1 schematically shows a flight management system, FMS.

This FMS computer shown in FIG. 1 conventionally comprises a central processing unit 101, which communicates with an input-output interface 106, a program memory 102, a working memory 103, and a data storage memory 104, by means of circuits 105 for transferring data between these various elements. The input-output interface is connected to various devices such as a human-machine interface 107, sensors 108, etc. An aircraft-specific performance table and a flight-plan ground trajectory are stored in the data memory. Recall that a flight-plan ground trajectory is established from a list of intermediate points IP that the aircraft must fly over and is composed of straight and/or curved segments joining these points as illustrated in FIG. 2b. The curves correspond to transitions calculated around points IP while considering the aircraft's limitations. This ground trajectory is sampled at a step p: a list of intermediate points P and ground altitude points alt(P) is thus obtained. The aircraft's performance and limitations are found in the performance table, for example speed limitations, aircraft slope limitations, its maximum altitude, its stalling speed, its fuel consumption, its turning radius, its roll, etc.

In particular the FMS computer is connected to a database 109 of the terrain to be flown over, which is generally represented in the form of rectangular grids.

The method according to the invention is based on determining a low-altitude flight profile by means of the FMS computer. It includes the following steps consisting:

a) based on the ground trajectory, in calculating right "lat mrg R" and left "lat mrg L" lateral margins in particular as a function of the performance and navigation limitations of the aircraft and the estimated position uncertainty or EPU. When the estimated position uncertainty varies and when this variation is stabilized over time, the lateral margins are updated along with the resulting calculation. These lateral margins could be identical;

b) for each point P on the ground trajectory, in calculating the maximum altitude of the terrain between the two limits defined by the ground trajectory offset by the right lateral margin and that of the same point offset by the left lateral margin. A vertical margin "vert mrg" is added to this maximum altitude to obtain a safe altitude "alt safe" for a point $P_{safe}$.

This can also be written:

alt safe $(P_{safe})$=Max[alt(P+lat mrg R), alt(P+lat mrg L)]+ vert mrg.

The vertical margin is determined by the pilot and could take the terrain into consideration.

Figure 2A:
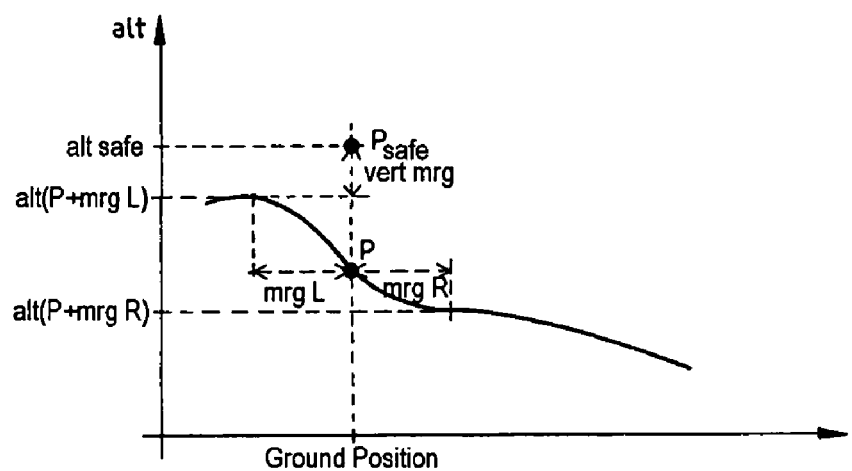
FIGS. 2a and 2b schematically represent a safe profile seen along a cross-section perpendicular to the ground trajectory (FIG. 2a), or in perspective (FIG. 2b)
Figure 2B:
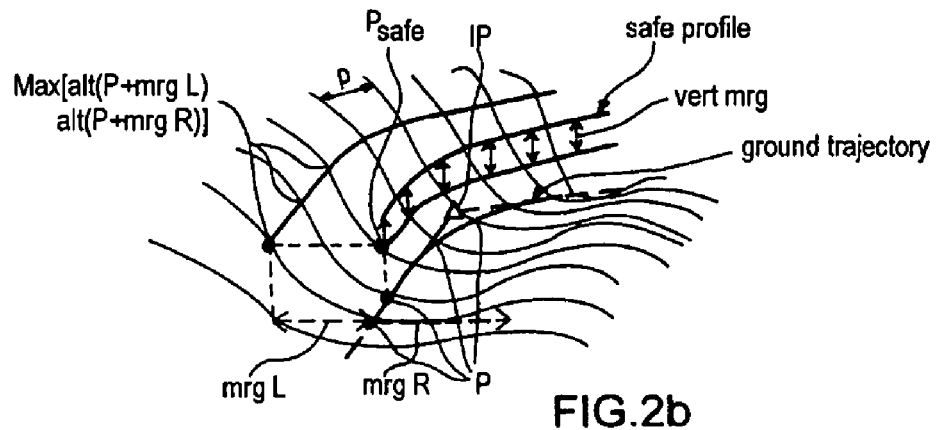
Figure 4:
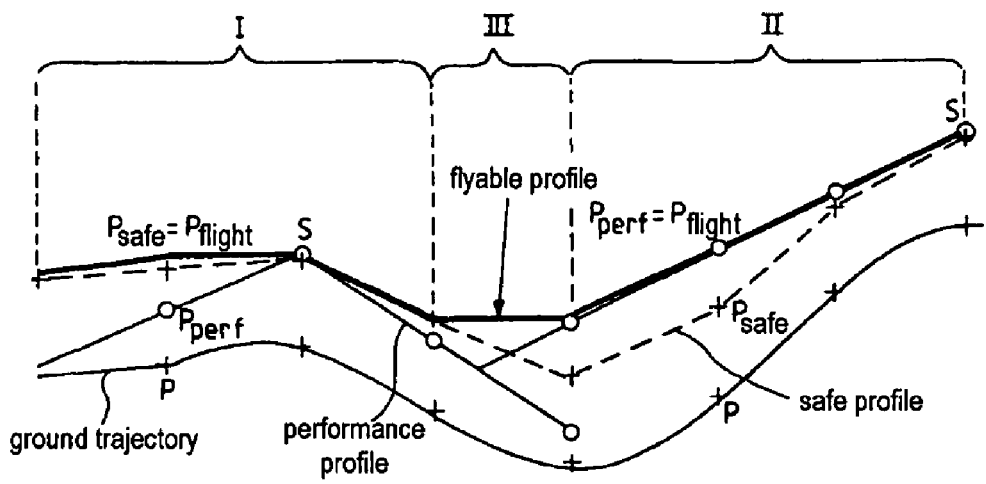
FIG. 4 shows schematically a ground trajectory, and safe, performance and flyable at low-altitude profiles seen in cross-section along the axis of the ground trajectory.

By associating these safe altitudes in this way with the points P of the ground trajectory, a list of points $P_{safe}$ joined by segments which form a safe profile illustrated in FIGS. 2a and 2b is obtained;

c) by eliminating the lower intermediate points, in extracting the highest points S from the safe profile, represented in FIG. 4. This means that a point S is such that the K preceding and following points, where K>0, are at a lower altitude. More precisely, a summit S is such that the offset between the average slopes of the segments on the K preceding points and the K following points is greater than a threshold slope. The parameter K and the threshold slope depend on the relief and/or performance and limitations of the aircraft; preferably they are also determined as a function of the sampling step p. For example, for K=5, threshold slope=5° for p=300 m.

The purpose of this extraction of the summits S is to reduce the number of points to be processed and consequently the response time of the flight computer which must be as short as possible. The number of points to be processed is reduced for example by a factor of 20 to 50.

Figure 3:
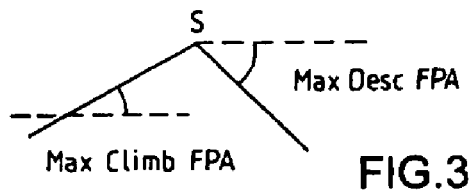
FIG. 3 shows the maximum climb MaxClimbFPA and maximum descent MaxDescFPA slopes.

When successive points S are too close, meaning their separation is less than a minimum distance Dmin, they are placed in memory in a list and only the two points S from this list having the highest altitude are selected. For example Dmin is equal to twice the aircraft's turning radius; and d) then in estimating the aircraft's weight at these points S as a function in particular of the curvilinear distance along the safe profile between the aircraft and of this point S and of the aircraft's fuel consumption over this distance if it were flown level, meaning with a zero slope. This consumption depends on the altitude of the point S, the aircraft's estimated speed, performance and limitations, and the wind speed and direction. From this estimated weight at S and the aircraft-specific performance table determining the maximum slopes before and after each point S, meaning the maximum slopes which the aircraft could support for reaching S and for following the lowest ground trajectory after having passed through S. The maximum slopes coming from the performance table depend on the aircraft's weight, altitude of the summits, ΔISA (International Standard Atmosphere) temperature variation relative to the standard temperature, aircraft speed and potentially external loads on the aircraft that could have an impact on the drag forces. These maximum slopes, which depend on the altitude of the terrain to be flown over and defined in consideration of the most critical flight conditions (engine failure, etc.), are respectively designated MaxClimbFPA for the maximum climbing slope and MaxDescFPA for the maximum descent slope. They are shown in FIG. 3. In particular MaxClimbFPA is determined as a function of the aircraft's available power and possibly by assuming an engine failure.

These maximum slopes are next weighted as a function of the wind speed and direction. In the presence of a tail wind component, the aircraft must start to climb earlier and the slope of the segment climbing towards S will then be reduced or anticipated; that of the descending segment will preferably be maintained. In the presence of a head wind component, the slope of the segment climbing towards S will be steeper and the aircraft will reach the altitude of the summit S earlier; that of the descending segment will be reduced or delayed in time. The wind speed components come for example from short-term weather predictions or real-time estimates and are stored in the data memory of the FMS.

The altitude of a starting point S and the weighted maximum slopes define two performance segments which have a first end at S, weighted slopes MaxClimbFPA and MaxDescFPA on either side of the point S and a second end at the point of intersection with the relief or another segment. The segments determined for the set of points S form a performance profile which makes it possible to associate a performance altitude "alt perf" with each point P of the ground trajectory. When one point on the ground trajectory corresponds to two performance altitudes arising from a rising and a descending performance segment, the higher altitude is chosen as shown in FIG. 3, in the region III; and e) in determining a flyable low-altitude profile illustrated in FIG. 4 by choosing for each point P of the ground trajectory a flight altitude "alt flight" equal to the higher altitude between that of the safe profile and that of the performance profile. The point obtained is designated by $P_{flight}$. This can also be written:

alt flight ($P_{flight}$)=Max [alt safe (P), alt perf (P)].

The segments that join the set of points of $P_{flight}$ form a flyable profile, which associates with each point P of the ground trajectory a flight altitude "alt flight". In the example from FIG. 4, the flyable profile coincides with the safe profile in region I and with the performance profile in region II. A new segment is created joining a point from the safe profile to a point from the performance profile as illustrated in region III.

The determination of this flyable profile can be optimized according to the following three criteria which are minimized depending on the context:
  average height between the flyable profile and the terrain's altitude,
  lateral margins,
  flight computer's response time for calculating the flyable profile.

In case of degraded operation of the device following, for example, a failure or voluntary interruption of the function, the last criterion is preferred.

Other optimizations may be involved.

The ground trajectory is formed of segments and/or curves joining points P to fly over. These points are generally spaced by a constant step p shown in FIG. 2b. For example, p=100 m is used. This constant step sampling is costly in calculation time for the calculations based on this trajectory. A first solution consists of taking a larger sampling step p. Another solution consists of using a sampling step p which varies as a function of the terrain's slope; the ground trajectory points are filtered as a function of the slope between these points. The smaller the slope the larger the step p, and, inversely, the more the slope varies, as is the case in mountainous terrain, the smaller the step p. The step however has a lower limit $p_{inf}$ and an upper limit $p_{sup}$. For example $p_{inf}$ is taken to be equal to half the width of the grid from the terrain database, or about 0.15/2 N (nautical miles) and $p_{sup}$ equal to about 1 km. These solutions make it possible to reduce the number of points to be processed by several specific filters.

Figure 5:
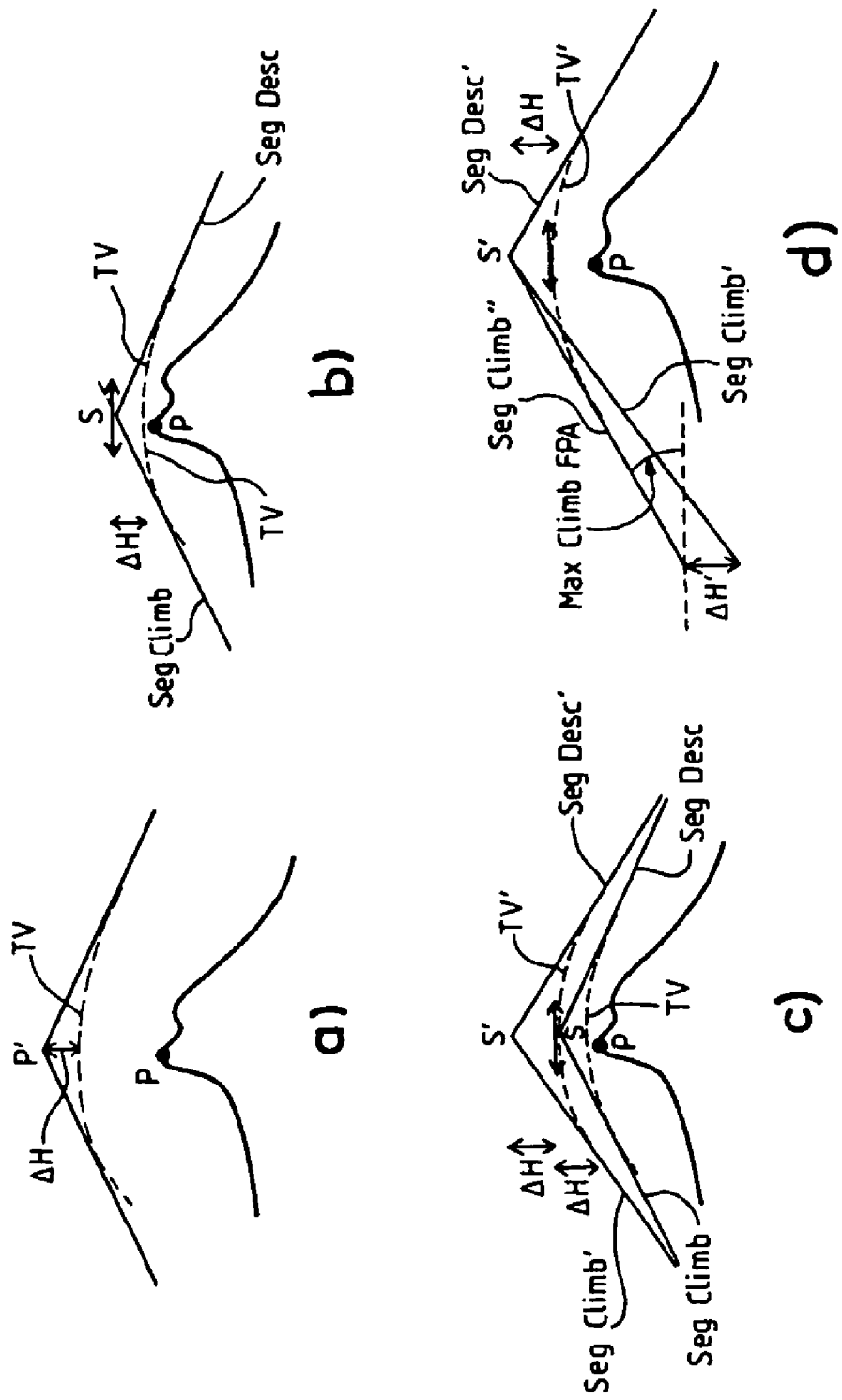
FIGS. 5a, 5b, 5c and 5d schematically illustrate the calculation of a vertical transition around a summit or an obstacle S.

Often, as shown in FIG. 5a, considering the vertical security margins of a conventional flight-plan trajectory in particular comprising a point P to overfly by passing through P', the aircraft can overfly this point P by following a theoretical curve called theoretical vertical transition TV flown at a constant load factor and which passes below the planned flight trajectory, specifically below P' at a distance ΔH. The theoretical vertical transition TV calculated by the FMS has the shape of a parabola which is tangential to the two segments joining P'. But when the flight trajectory is that of the low-altitude flyable profile calculated at a minimum, it is dangerous for the aircraft to follow this theoretical vertical transition which would pass below a point S as shown in FIG. 5b. A solution illustrated in FIG. 5c consists of artificially raising the flyable profile at S by a height ΔH to obtain S': the expected vertical transition TV' is thus also raised by ΔH relative to TV. The flyable profile is then modified by adjusting the segments SegClimb and SegDesc arising from S such that the new segments SegClimb' and SegDesc' arising from S' are tangent to the expected transition TV' as shown in FIG. 5c: a new flyable profile is thus obtained.

When the slopes (of one or) of both new segments SegClimb' and SegDesc' are respectively greater than MaxClimbFPA and MaxDescFPA, the new segment(s) are replaced by segments SegClimb" and SegDesc" whose imposed slopes are respectively MaxClimbFPA and MaxDescFPA. The lower extremity of (this or) these segment(s) SegClimb" and SegDesc" are then raised by a corresponding height ΔH' as illustrated in FIG. 5d.

The invention claimed is:

1. A method of assisting low-altitude navigation of an aircraft equipped with a flight management system suited to determining a flight-plan ground trajectory for the aircraft based on a sequence of straight and/or curved segments joining intermediate points on the ground P at an altitude alt(P), where the ground trajectory takes into consideration the aircraft's performance and limitations, comprising the following steps:
  for each point P on the ground trajectory, calculating a safe altitude, alt safe, to obtain a point $P_{safe}$ such that alt safe ($P_{safe}$)=Max[alt(P+lat mrg R), alt(P+lat mrg L)]+vert mrg, where lat mrg R and lat mrg L are respectively predetermined right and left lateral margins and vert mrg is a predetermined vertical margin,
  calculating a safe profile formed from safe segments joining the points $P_{safe}$,
  extracting summit points S from among the points $P_{safe}$ of the safe profile such that the K points located before S and after S have a safe altitude below that of S, K being a determined parameter,
  determining the aircraft's weight at these points S as a function of the distance along the safe profile between the aircraft and this point S and of the aircraft's consumption over this distance, where the consumption is an aspect of 'the aircraft's performance and limitations,
  for each point S, determining the maximum climb slope (MaxClimbFPA) that the aircraft can support to reach S and the maximum-descent slope (MaxDescFPA) which the aircraft can support for following the lowest ground trajectory after having passed through S as a function of the aircraft's performance and limitations and the weight, defining two performance segments which have a first end at S, slopes MaxClimbFPA and MaxDescFPA on either side of the point S and a second end at the point of intersection with the terrain or with another performance segment arising from another point S and calculating a performance profile formed from performance segments and which makes it possible to associate at each point P of the safe profile a performance altitude, alt perf (P).

2. The method of assisting navigation as claimed in claim 1, further comprising determining a flyable low-altitude profile based on the safe profile and the performance profile.

3. The method of assisting navigation as claimed in claim 1, wherein the determination of the flyable low-altitude profile includes calculating for each point P of the ground trajectory a low-altitude flight altitude, alt flight, for obtaining a point $P_{flight}$ such that
  alt flight($P_{flight}$)=Max[alt safe (P),alt perf (P)],
  where the flyable low-altitude profile is formed from segments joining the points $P_{flight}$.

4. The method of assisting navigation as claimed in claim 1, comprising sampling the points P according to a step p, and in that K is determined as a function of p and/or a threshold slope and the terrain and/or aircraft performance and limitations.

5. The method of assisting navigation as claimed in claim 1, wherein since the flight management system has an estimated position uncertainty, lat mrg R and L are determined as a function of the aircraft's performance and limitations, and of the estimated position uncertainty.

6. The method of assisting navigation as claimed in claim 1, wherein since the flight management system has the wind speed and direction, aircraft speed, altitude of the terrain, and local temperature, the slopes MaxClimbFPA and Max-DescFPA are weighted as a function of the wind speed and direction and aircraft speed and altitude of the terrain and/or local temperature.

7. The method of assisting navigation as claimed in claim 2, wherein since the flight management system has the wind speed and direction, aircraft speed, altitude of the terrain, and local temperature, the slopes MaxClimbFPA and Max-DescFPA are weighted as a function of the wind speed and direction and/or aircraft speed and/or altitude of the terrain and local temperature.

8. The method of assisting navigation as claimed in claim 3, wherein since the flight management system has the wind speed and direction, aircraft speed, altitude of the terrain, and local temperature, the slopes MaxClimbFPA and Max-DescFPA are weighted as a function of the wind speed and direction and/or aircraft speed and/or altitude of the terrain and local temperature.

9. The method of assisting navigation, as claimed in claim 4, wherein since the flight management system has the wind speed and direction, aircraft speed, altitude of the terrain, and local temperature, the slopes MaxClimbFPA and Max-DescFPA are weighted as a function of the wind speed and direction and/or aircraft speed and/or altitude of the terrain and local temperature.

10. The method for assisting navigation as claimed in claim 5, wherein since the flight management system has the wind speed and direction, aircraft speed, altitude of the terrain, and local temperature, the slopes MaxClimbFPA and Max-DescFPA are weighted as a function of the wind speed and direction and/or aircraft speed and/or altitude of the terrain and local temperature.

11. The method of assisting navigation as claimed in claim 1, wherein since the aircraft is equipped with the engines, the slope MaxClimbFPA is calculated assuming an engine failure.

12. The method of assisting navigation as claimed in claim 2, wherein since the aircraft is equipped with the engines, the slope MaxClimbFPA is calculated assuming an engine failure.

13. The method of assisting navigation as claimed in claim 3, wherein since the aircraft is equipped with the engines, the slope MaxClimbFPA is calculated assuming an engine failure.

14. The method of assisting navigation as claimed in claim 4, wherein since the aircraft is equipped with the engines, the slope MaxClimbFPA is calculated assuming an engine failure.

15. The method of assisting navigation as claimed in claim 1, wherein the flight management system being connected to a terrain database composed of grids having a predetermined width L, and comprising information on the terrain's slope, it involves sampling the points P according to a step p determined as a function of the terrain's slope and the width L of the grids.

16. The method of assisting navigation as claimed in claim 2, wherein the flight management system being connected to a terrain database composed of grids having a predetermined width L, and comprising information on the terrain's slope, it involves sampling the points P according to a step p determined as a function of the terrain's slope, and the width L of the grids.

17. The method of assisting navigation as claimed in claim 3, wherein the flight management system being connected to a terrain database composed of grids having a predetermined width L, and comprising information on the terrain's slope, it involves sampling the points P according to a step p determined as a function of the terrain's slope, and the width L of the grids.

18. The method of assisting navigation as claimed in claim 4, wherein the flight management system being connected to a terrain database composed of grids having a predetermined width L, and comprising information on the terrain's slope, it involves sampling the points P according to a step p determined as a function of the terrain's slope, and the width L of the grids.

19. The method of assisting navigation as claimed in claim 2, wherein since a transition parabola is associated with the segments SegClimb and SegDesc of the flyable profile arising from a summit S, and since the top of the parabola is situated at $\Delta H$ from S, it consists in:

calculating a new summit S' located at $\Delta H$ above the summit S;

raising the transition parabola by $\Delta H$; and defining segments SegClimb' and SegDesc' arising from S' in a manner such that they are tangent to the raised transition parabola and obtain a new flyable profile.

20. A flight management system for an aircraft comprising a central unit which communicates with an input-output interface, a program memory, a working memory, and a data storage memory, by means of data-transfer circuits, the input-output interface being connected to a database of the terrain to be flown over, wherein the program memory includes a program for implementing the method as claimed in claim 1.

* * * * *